United States Patent
Sakai et al.

(10) Patent No.: US 8,891,921 B2
(45) Date of Patent: Nov. 18, 2014

(54) OPTICAL WAVEGUIDE

(75) Inventors: Daichi Sakai, Ibaraki (JP); Toshihiro Kuroda, Ibaraki (JP); Hiromichi Aoki, Ibaraki (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 0 days.

(21) Appl. No.: 13/988,532

(22) PCT Filed: Nov. 22, 2011

(86) PCT No.: PCT/JP2011/076944
§ 371 (c)(1),
(2), (4) Date: Jul. 12, 2013

(87) PCT Pub. No.: WO2012/070585
PCT Pub. Date: May 31, 2012

(65) Prior Publication Data
US 2013/0287354 A1 Oct. 31, 2013

(51) Int. Cl.
*G02B 6/42* (2006.01)
*G02B 6/036* (2006.01)
*G02B 6/122* (2006.01)

(52) U.S. Cl.
CPC .............. *G02B 6/036* (2013.01); *G02B 6/1228* (2013.01)
USPC .......................................................... 385/43

(58) Field of Classification Search
CPC ...................................................... G02B 6/1228
USPC ................................................. 385/43, 27–28
See application file for complete search history.

(56) References Cited

U.S. PATENT DOCUMENTS 8,326,100 B2 * 12/2012 Chen et al. ...................... 385/43

FOREIGN PATENT DOCUMENTS

| JP | 2001-42149 | 2/2001 |
| JP | 2003-35833 | 2/2003 |
| WO | WO 2007/026601 A1 | 3/2007 |

* cited by examiner

*Primary Examiner* — Eric Wong
(74) *Attorney, Agent, or Firm* — Antonelli, Terry & Kraus, LLP.

(57) ABSTRACT

There are provided an optical waveguide including: a substrate 1; a lower clad layer 2; a core pattern 3 with a taper in thickness direction; and an upper clad layer 4, the lower clad layer, the core pattern, and the upper clad layer being sequentially laminated on the substrate 1, in which the lower clad layer 2 has a cutting part 5. There also provided with an optical waveguide including: a substrate 1; a lower clad layer 2; a core pattern 3 with a taper in thickness direction; and an upper clad layer 4, the lower clad layer, the core pattern, and the upper clad layer being sequentially laminated on the substrate 1, in which the lower clad layer 2 has a dummy part on the top. These optical waveguides can secure alignment tolerance when connected with an optical element.

15 Claims, 4 Drawing Sheets

OPTICAL WAVEGUIDE

TECHNICAL FIELD

The present invention relates to an optical waveguide, specifically an optical waveguide capable of securing alignment tolerance when the optical wave guide is connected with an optical element.

BACKGROUND ART

As information capacity increases, in not only the communication field including a trunk line and an access system but also information processing in a router and a server, the optical interconnection technology using an optical signal has been developed. Specifically, to use light for short distance signal transmission between or in boards in a router and a server device, an optical waveguide, which has a higher flexibility of wiring and can more highly densify wiring compared with an optical fiber, is used as an optical transmission channel.

An optical waveguide may be connected with another optical element, for example, an optical fiber when used as a device of an optical product (for example, Patent Document 1). When an optical waveguide connecting with a photodiode or a laser diode, the diameter allowing light to falling on a photodiode needs to be decreased, and the diameter receiving light from a laser diode needs to be increased (for example, Patent Document 2). This requires securing alignment tolerance when an optical waveguide is connected with an optical element.

PRIOR ART DOCUMENTS

Patent Documents

Patent Document 1
  JP-A-2001-42149
Patent document 2
  WO2007-026601

SUMMARY OF THE INVENTION

Problems to be Solved by the Invention

The present invention is achieved to solve the above-mentioned problem. The objective of the present invention is to provide an optical waveguide capable of securing alignment tolerance when the optical waveguide is connected with an optical element.

Means for Solving the Problems

As a result of their extensive study, the inventors found that providing a cutting part; or a dummy core or a dummy clad on a lower clad layer of an optical waveguide can adjust the thickness of the upper clad layer or the optical waveguide so as to or not so as to taper the thickness. Then, the inventors found that this finding solves the above-mentioned problem and achieved the present invention.

The present invention provides an optical waveguide includes a substrate; a lower clad layer; a core pattern with a taper in thickness direction; and an upper clad layer, and the lower clad layer, the core pattern, and the upper clad layer are sequentially laminated on the substrate, in which the lower clad layer has a cutting part, or the lower clad layer has a dummy layer on the top.

Advantages of the Invention

The optical waveguide of the present invention, particularly an optical wave guide with a core pattern with a taper in thickness direction can secure alignment tolerance when connected with an optical element because the thickness of the optical waveguide is adjusted so as to or not so as to taper this thickness.

EMBODIMENTS FOR CARRYING OUT THE INVENTION

Figure 1:
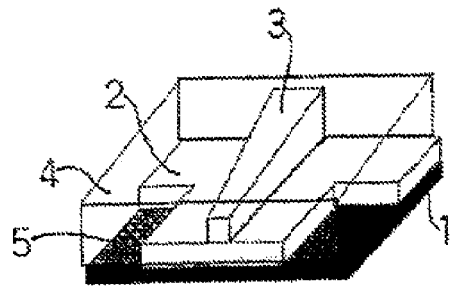
FIG. 1 shows the perspective view illustrating an example of the optical waveguide of the present invention.

The optical waveguide of the present invention will be explained in reference to FIGS. 1-16. As shown in FIGS. 1-9, the optical waveguide of the present invention includes a substrate 1; a lower clad layer 2; a core pattern 3 with a taper in thickness direction; and an upper clad layer 4, the lower clad layer, and the core pattern, and the upper clad layer are sequentially laminated on the substrate, in which the lower clad layer 2 has a cutting part 5.

Figure 2:
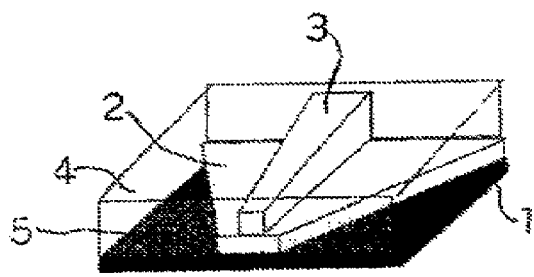
FIG. 2 shows the perspective view illustrating one of other examples of the optical waveguide of the present invention.
Figure 5:
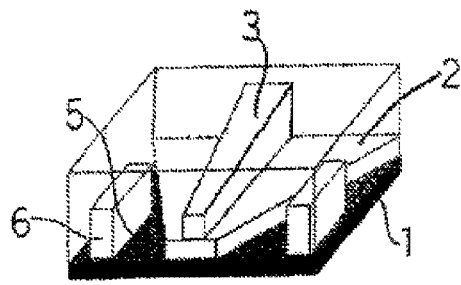
FIG. 5 shows the perspective view illustrating one of other examples of the optical waveguide of the present invention.
Figure 8:
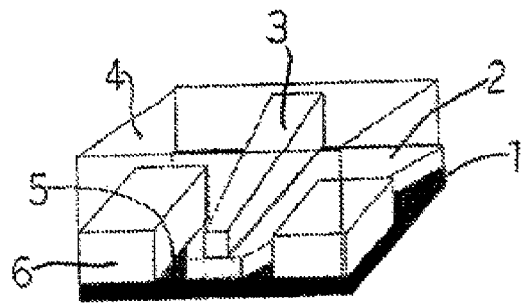
FIG. 8 shows the perspective view illustrating one of other examples of the optical waveguide of the present invention.

As shown in FIGS. 2, 5, and 8, the optical waveguide of the present invention may have a cutting part 5 with an area at the thin side of the taper of the core pattern 3 being larger than that at the thick side of the taper.

Figure 3:
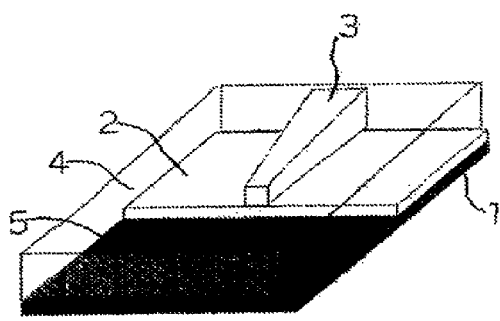
FIG. 3 shows the perspective view illustrating one of other examples of the optical waveguide of the present invention.
Figure 6:
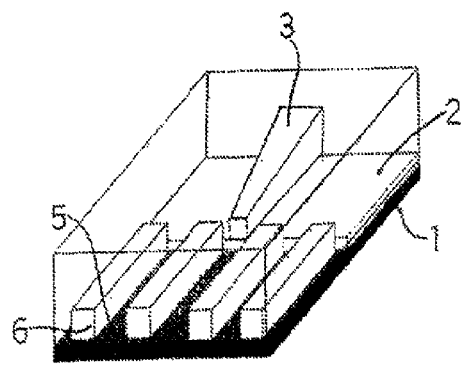
FIG. 6 shows the perspective view illustrating one of other examples of the optical waveguide of the present invention.
Figure 9:
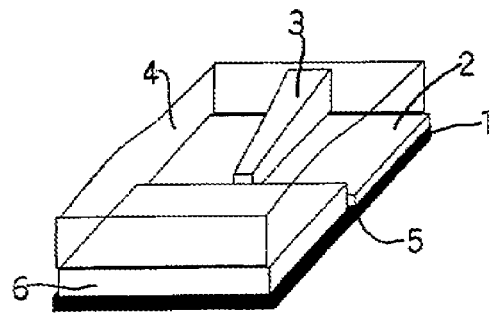
FIG. 9 shows the perspective view illustrating one of other examples of the optical waveguide of the present invention.

As shown in FIGS. 3, 6, and 9, the optical waveguide may have a cutting part 5 in a part where no core patterns exist ahead of the tip end of the thin side of the taper of the core pattern 3.

As shown in FIGS. 1-3, in the optical waveguide of the present invention, the upper clad layer 4 may have a taper in thickness direction, and the taper becomes thinner toward in the same direction as the thinner direction of the taper of the core pattern.

As shown in FIGS. 4-9, the optical waveguide of the present invention may have a dummy core 6 in the cutting part 5 of the lower clad layer 2.

Figure 4:
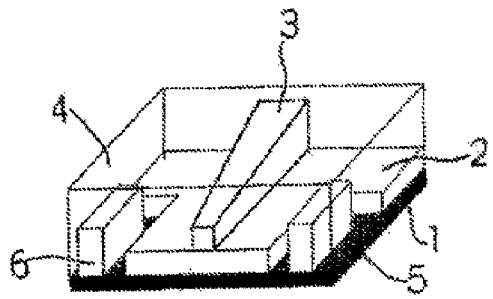
FIG. 4 shows the perspective view illustrating one of other examples of the optical waveguide of the present invention.
Figure 7:
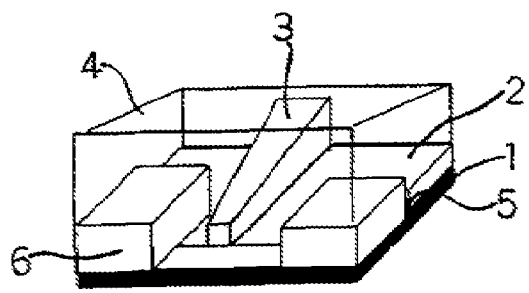
FIG. 7 shows the perspective view illustrating one of other examples of the optical waveguide of the present invention.

In this case, according to the wiring density of the dummy core 6, the upper clad layer 4 can be located parallel to the substrate face as shown in FIGS. 4-6; or the upper clad layer 4 can have a taper in thickness direction, and the taper becomes thinner toward in the opposite direction to the thinner direction of the taper of the core pattern 3, as shown in FIGS. 7-9.

As shown in FIGS. 10-15, the present invention provides an optical waveguide including: a substrate 1; a lower clad layer 2; a core pattern 3 with a taper in thickness direction; and an upper clad layer 4, the lower clad layer, the core pattern, and the upper clad layer being sequentially laminated on the substrate, in which the lower clad layer 2 has a dummy layer 7 on the top.

Figure 11:
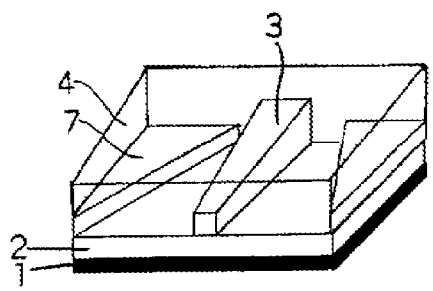
FIG. 11 shows the perspective view illustrating one of other examples of the optical waveguide of the present invention.
Figure 13:
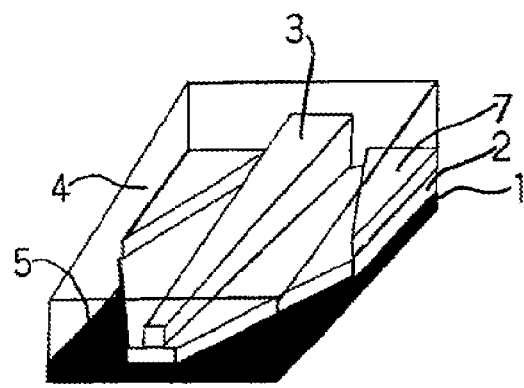
FIG. 13 shows the perspective view illustrating one of other examples of the optical waveguide of the present invention.

As shown in FIGS. 11 and 13, the optical waveguide of the present invention may have a dummy layer 7 with an area at the thick side of the taper of the core pattern 3 being larger than that at the thin side of the taper.

Figure 12:
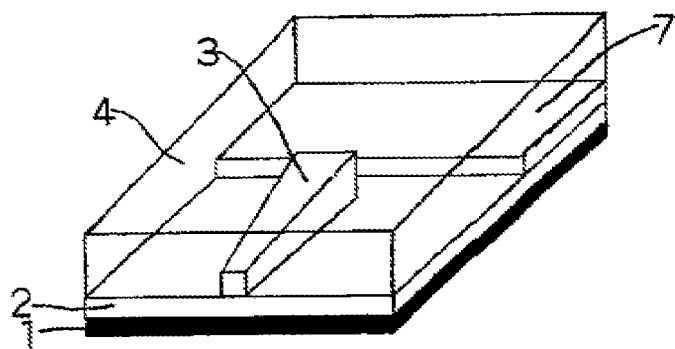
FIG. 12 shows the perspective view illustrating one of other examples of the optical waveguide of the present invention.
Figure 14:
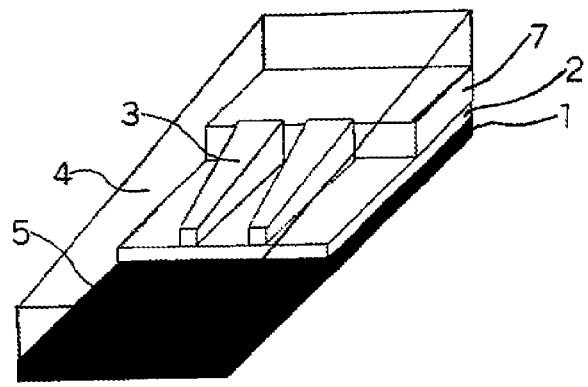
FIG. 14 shows the perspective view illustrating one of other examples of the optical waveguide of the present invention.

As shown in FIGS. 12 and 14, the optical waveguide may have a dummy layer 7 in a part where no core patterns exist behind the bottom end of the thin side of the taper of the core pattern 3.

In the optical waveguide of the present invention, the dummy layer 7 shown in FIGS. 10-15 is preferably a clad layer.

Figure 15:
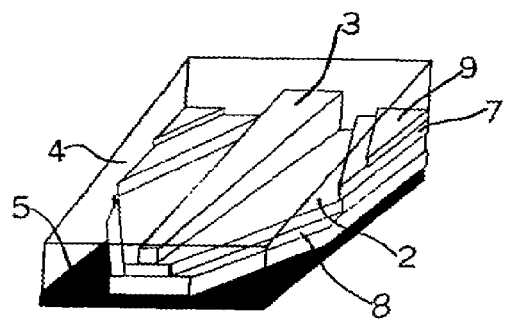
FIG. 15 shows the perspective view illustrating one of other examples of the optical waveguide of the present invention.

The optical waveguide may have a plurality of lower clad layers. For example, as shown in FIG. 15, the optical waveguide may have a lower clad layer 8 between the lower clad layer 2 and the substrate 1. The optical waveguide may have a plurality of dummy layers. For example, as shown in FIG. 15, the optical waveguide may have a dummy layer 9 on a dummy layer 7. The optical waveguide may have a plurality of core patterns 3 as shown in FIG. 14.

In the present invention, the core pattern 3 with a taper in thickness direction preferably has a taper in width direction.

Figure 16:
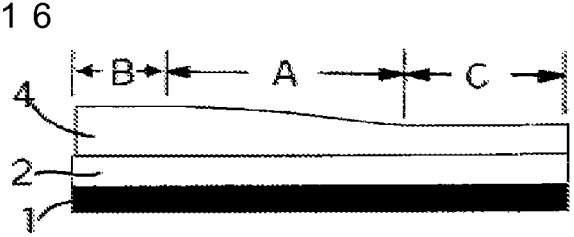
FIG. 16 shows the side view illustrating one of other examples of the optical waveguide of the present invention.

In the optical waveguide of the present invention, as shown in FIG. 16, the upper clad layer 4 may have not only a taper A but also flat parts B and/or C.

Each of the layers composing the optical waveguide of the present invention will be explained below. Clad layer and resin film for forming a clad layer The lower clad layers 2 and the upper clad 4 used in the present invention will be explained below. As the lower clad layers 2 and the upper clad 4, a resin for forming a clad layer or a resin film for forming a clad layer can be used.

The resin for forming a clad layer used in the present invention is not limited in particular as long as being a photo- or heat-curable resin composition which has a lower refractive index than the core pattern 3. For the resin for forming a clad layer, a thermosetting resin composition and a photosensitive resin composition can be preferably used. More suitably, the resin for forming a clad layer is preferably composed of a resin composition containing (A) a base polymer, (B) a photopolymerizable compound, and (C) a photopolymerization initiator. The components of the resin composition used for the resin for forming a clad layer in the lower clad layer 2 may be the same as or different from those in the upper clad layer 4. The refractive index of the resin composition in the lower clad layer 2 may be the same as or different from that in the upper clad layer 4.

The base polymer (A) is to form a clad layer and to secure the strength of the clad layer. The base polymer (A) is not limited in particular as long as being able to achieve this purpose. The base polymer (A) includes a phenoxy resin, an epoxy resin, a (meth)acrylic resin, a polycarbonate resin, a polyarylate resin, polyether amide, and polyether imide, a polyethersulfone, and the derivatives of thereof. These base polymers may be used alone or in combination with two or more kinds. Among the above-mentioned base polymers, from the viewpoint of the high heat resistance, a resin with an aromatic skeleton in the main chain is preferable, and a phenoxy resin is particularly preferable. From the viewpoint of capability of three dimensional crosslinking and from the viewpoint of improving the heat resistance, an epoxy resin, particularly an epoxy resin in a solid form at room temperature is preferable. The compatibility with the below-mentioned photopolymerizable compound (B) is important to secure the transparency of the resin for forming a clad layer. From this aspect, the above-mentioned phenoxy resin and (meth)acrylic resin are preferable. The (meta)acrylate denotes an acrylic resin and a methacrylic resin.

The phenoxy resin preferably contains bisphenol A, a bisphenol A epoxy compound, or derivatives thereof; or bisphenol F, a bisphenol F epoxy compound, or derivatives thereof as the structural unit of a copolymerizable component are preferable because the excellent heat resistance, adhesion, and solubility. The derivative of bisphenol A or the bisphenol A epoxy compound suitably includes tetrabromo bisphenol A and a tetrabromo bisphenol A epoxy compound. The derivative of bisphenol F or the bisphenol F epoxy compound suitably includes tetrabromo bisphenol F and a tetrabromo bisphenol F epoxy compound. The specific example of a bisphenol A/bisphenol F copolymerized phenoxy resin includes "PHENOTOHTO YP-70" (product name) available from Tohto Kasei Co., Ltd.

The epoxy resin in a solid form at room temperature includes, for example, bisphenol A epoxy resins such as "EPOTOHTO YD-7020," "EPOTOHTO YD-7019," and "EPOTOHTO YD-7017" (product names) available from Tohto Kasei Co., Ltd.; and "EPIKOTE 1010," "EPIKOTE 1009," and "EPIKOTE 1008" (product names) available from Japan Epoxy Resin Co. Ltd.

The photopolymerizable compound (B) is not limited in particular as long as polymerized by the irradiation of light such as ultraviolet rays but includes a compound with an ethylenic unsaturated group in the molecule and a compound with two or more epoxy groups in the molecule.

The compound with an ethylenic unsaturated group in the molecule includes (meta)acrylate, vinylidene halide, vinyl ether, vinylpyridine, and vinylphenol. Among these, from the viewpoint of the transparency and the heat resistance, (meth)acrylate is preferable.

As the (meta)acrylate, mono-functional, bi-functional, or tri- or poly-functional (meta)acrylate can be used. The (meta)acrylate denotes acrylate and methacrylate.

The compound with two or more epoxy groups in the molecule includes a bi-functional or poly-functional aromatic glycidyl ether such as a bisphenol A epoxy resin; a bi-functional or poly-functional aliphatic glycidyl ether such as a polyethylene glycol epoxy resin; a bi-functional cycloaliphatic glycidyl ether such as a hydrogenated bisphenol A epoxy resin; a bi-functional aromatic glycidyl ester such as phthalic acid diglycidyl ester; a bi-functional cycloaliphatic glycidyl ester such as tetrahydrophthalic acid diglycidyl ester; a bi-functional or poly-functional aromatic diglycidyl aniline such as N,N-diglycidyl amine; a bi-functional cycloaliphatic epoxy resin such as alicyclic diepoxy carboxylate; a bi-functional or poly-functional heterocyclic epoxy resin; and a bi-functional or poly-functional silicon-containing epoxy resin. These photopolymerizable compounds (B) may be used alone or in combination with two or more kinds.

The photopolymerization initiator (C) is not limited in particular. For example, when the component (B) is an epoxy compound, the photopolymerization initiator (C) includes aryldiazonium salt, diaryliodonium salt, triarylsulfonium salt, triarylselenonium salt, dialkylphenacylsulfonium salt, and dialkyl-4-hydroxyphenyl sulfonium salt, and sulfonic acid ester When the component (B) is a compound with an ethylenic unsaturated group in the molecule, the photopolymerization initiator (C) includes an aromatic ketone such as benzophenone; a quinone such as 2-ethylanthraquinone; a benzoin ether compound such as benzoin methyl ether; a benzoin compound such as benzoin; a benzyl derivative such as benzyl dimethylketal; a 2,4,5-triaryl imidazole dimer such as 2-(o-chlorophenyl)-4,5-diphenylimidazole dimer; a benzoimidazole such as 2-mercaptobenzimidazole; a phosphine oxide such as bis(2,4,6-trimethylbenzoyl) phenyl phosphine oxide; an acridine derivative such as 9-phenyl acridine; N-phenylglycine; an N-phenylglycine derivative; and a coumarin compound. A thioxanthone compound may be combined with a tertiary amine compound. For example, diethyl thioxanthone is combined with dimethylaminobenzoic acid. Among the above-mentioned compounds, from the viewpoint of improving the transparency of a core layer and a clad layer, aromatic ketones and phosphine oxides are preferable.

These photopolymerization initiators (C) may be used alone or in combination with two or more kinds.

The blending amount of the base polymer (A) is preferably 5-80 mass % on the basis of the total amount of the components (A) and (B). The blending amount of the photopolymerizable compound (B) is preferably 95-20 mass % on the basis of the total amount of the components (A) and (B).

The blending amount of 5 mass % or more of the component (A) and 95 mass % or less of the component (B) can easily form a film of the resin composition. On the other hand, the blend of 80 mass % or less of the component (A) and 20 mass % or more of the component (B) can easily conduct curing in entanglement with the base polymer (A) to improve the pattern formability in the formation of the optical waveguide and to sufficiently promote photo-curing reaction. From these viewpoints, the blending amounts of the components (A) and (B) are preferably 10-85 mass % and 90-15 mass %, more preferably 20-70 mass % and 80-30 mass %, respectively.

The blending amount of the photopolymerization initiator (C) is preferably 0.1 to 10 parts by mass on the basis of 100 parts by mass of the total amount of the components (A) and (B). The blending amount of 0.1 parts by mass or more provides sufficient photo-sensitivity. On the other hand, the blending amount is 10 parts by mass or less also provides sufficient photo-sensitivity inside without the optical absorption in the surface layer of the photosensitive resin composition being increased during exposure to light. When used as the optical waveguide, this blending amount is also preferable because the light absorption of the photopolymerization initiator itself never affects the increase of the optical transmission loss. From these viewpoints, the blending amount of the polymerization initiator(C) is preferably 0.2-5 parts by mass.

Optionally, the resin for a clad layer may further contain so-called additives, such as an antioxidant, a yellowing preventing agent, an ultraviolet ray absorbent, a visible light absorbent, a colorant, a plasticizer, a stabilizer, and a filler in a ratio to the extent not impairing the advantages of the present invention.

In the present invention, a method of forming a clad layer is not limited in particular. The clad layer needs to be formed by, for example, applying a resin for forming a clad layer or laminating a resin film for forming a clad layer. The method of applying a resin for forming a clad layer is not limited in particular.

For example, a resin composition containing the components (A)-(C) needs to be applied by a conventional method.

The resin film for forming a clad layer used for the lamination can be easily fabricated by, for example, dissolving the resin composition in a solvent, applying the dissolved resin composition to a carrier film, and then removing the solvent.

The lower clad layers 2 and the upper clad 4 preferably have a thickness falling within the range of 5-500 μm after dried. The thickness of 5 μm or more can secure the clad thickness necessary for the confinement of light. The thickness of 500 μm or less easily controls the film thickness to be uniform. From these viewpoints, the thickness of the lower clad layers 2 and the upper clad 4 more preferably falls within the range of 10-100 μm.

To embed the core pattern 3, the upper clad layer 4 is preferably thicker than the core pattern 3.

As a method of forming the cutting part 5 in the lower clad layer 2 as shown in FIGS. 1-9 and 13-15, the lower clad layer 2 needs to be formed by etching. The use of a photosensitive lower clad layer 2 can form the cutting part 5 by exposure and development.

As a method of forming the clad layers 7 and 9 as dummy layers as shown in FIGS. 10-15, the clad layers 7 and 9 need to be formed by etching in the same way as the lower clad layer 2. The use of clad layers 7 and 9 can form the cutting part 5 by exposure and development.

Resin for Forming a Core Layer and Resin Film for Forming a Core Layer

In the present invention, a method of forming the core pattern 3 laminated on the lower clad layer 2 is not limited in particular. For example, a core layer needs to be formed by applying a resin for forming a core layer or laminating a resin film for forming a core layer to form the core pattern 3 by etching.

In the present invention, when the dummy core 6 shown in FIGS. 4-9 is formed, the optical waveguide can be efficiently fabricated by forming a core layer and then by forming the core pattern 3 and the dummy core 6 by simultaneous etching.

In the case of a core layer formed on the lower clad layer 2 after laminated, the surface of the core layer from the surface of the substrate 1 is higher than that of the core layer of a cutting part formed on the substrate 1. As a method of forming the core pattern 3 with a taper, the top surface of the core layer is planarized by being pressurized with a rigid board or the like to move the resin for forming a core layer so as to taper the core pattern. The angle of the taper can be adjusted by appropriately adjusting the pressure and the temperature.

The resin for forming a core layer film, particularly used for the core pattern 3 is designed so as to have a higher refractive index than the cladding layers 2 and 4. For the resin for forming a core layer film, a resin composition capable of forming a core pattern with active light can be used.

The method of forming a core layer before patterning is not limited, including a method of applying the resin composition by a conventional method.

The thickness of the resin film for forming a core layer is not limited in particular but typically adjusted so that the thickness of the core layer after drying is adjusted to 10-100 μm. The film with a thickness of 10 μm or more has an advantage that the alignment tolerance can further be expanded in the bond with a light receiving and emitting element or an optical fiber after the optical waveguide is formed. The film with a thickness of 100 μm or less has an advantage that the binding efficiency is improved in the bond with a light receiving and emitting element or an optical fiber after the optical waveguide is formed. From these viewpoints, the thickness of the film preferably falls within the range of 30 to 70 μm.

The resin film for forming a clad layer and the resin film for forming a core layer maybe formed on a career film. The career film preferably has flexibility and toughness, which is made of, for example, a polyester, such as polyethylene terephthalate, polybutylene terephthalate, or polyethylene naphthalate; or polyethylene, polypropylene, polyamide, polycarbonate, polyphenylene ether, polyether sulfide, polyarylate, a liquid crystalline polymer, polysulfone, polyethersulfone, polyether ether ketone, and polyether imide, polyamide-imide, polyimide, or the like. The thickness of the carrier film is preferably 5-200 μm. The thickness of 5 μm or more has an advantage that strength as a carrier film can be easily obtained. The thickness of 200 μm or less has an advantage that the gap with a mask for forming a pattern is small enough to form a smaller pattern. From these viewpoints, the thickness of the carrier film falls within the range of more preferably 10-100 μm, particularly preferably 15-50 μm.

Substrate

The material of the substrate 1 is not limited in particular. The substrate includes, for example, a glass epoxy resin substrate, a ceramic substrate, a glass substrate, a silicon substrate, a plastic substrate, a metal substrate, a substrate having a resin layer, a substrate having a metal layer, a plastic film, a plastic film having a resin layer, and a plastic film having a metal layer.

A substrate with flexibility and toughness as the substrate 1, for example, a career film of the resin film for forming a clad layer and the resin film for forming a core layer may be used to form an optical waveguide with flexibility.

When there is no adhesion between the substrate 1 and the lower clad layer 2, an adhesive layer may be provided therebetween.

The material of the adhesive layer is not limited in particular but preferably includes double-faced tape, UV or thermosetting adhesive, prepreg, buildup material, and various adhesives used for fabricating an electrical wiring board.

EXAMPLE

The present invention will be explained in reference to the examples in detail below but is not limited to the following examples without departing the scope of the invention.

Example 1

Preparation of Optical Waveguide of FIG. 1

Preparation of Resin Film for Forming a Clad Layer

Preparation of Base Polymer (A): (meth)acrylic Polymer (A-1)

In a flask equipped with a stirrer, a cooling pipe, a gas inlet tube, a dropping funnel, and a thermometer, 46 parts by mass of propylene glycol monomethyl ether acetate and 23 parts by mass of methyl lactate were added and then stirred with nitrogen gas being introduced. The liquid temperature was increased to 65° C. Subsequently, a mixture of 47 parts by mass of methyl methacrylate, 33 parts by mass of butyl acrylate, 16 parts by mass of 2-hydroxyethyl methacrylate, 14 parts by mass of methacrylic acid, 3 parts by mass of 2,2'-azobis(2,4-dimethylvaleronitrile), 46 parts by mass of propylene glycol monomethyl ether acetate and 23 parts by mass of methyl lactate was added dropwise for 3 hours and stirred at 65° C. for 3 hours, then at 95° C. for 1 hour to obtain the (meth)acrylic polymer (A-1) solution (solid content: 45 mass %).

Measurement of Weight Average Molecular Weight

The weight average molecular weight (standard polystyrene conversion) of the polymer (A-1) measured with a GPC instrument ("SD-8022," "DP-8020," and "RI-8020" available from Tosoh Corporation) was $3.9 \times 10^4$. The columns used were "Gelpack GL-A150-S" and "Gelpack GL-A160-S" available from Hitachi Chemical Co., Ltd.

Measurement of Acid Value

The acid value of the polymer (A-1) measured was 79 mgKOH/g. The acid value was calculated from the amount of a 0.1 mol/L potassium hydroxide aqueous solution that was required for neutralizing the polymer (A-1) solution. The point where phenolphthalein added as an indicator was changed from colorless to pink was defined as the neutralization point.

Preparation of Resin Varnish for Forming a Clad Layer 84 parts by mass (solid content: 38 parts by mass) of the polymer (A-1) solution (solid content: 45 mass %) as the base polymer (A); 33 parts by mass of urethane(meth)acrylate having a polyester skeleton ("U-200AX" available from Shin-Nakamura Chemical Co., Ltd.) and 15 parts by mass of urethane(meth)acrylate having a polypropylene glycol skeleton ("UA-4200" available from Shin-Nakamura Chemical Co., Ltd.) as the photo-curable component (B); 20 parts by mass (solid content: 15 parts by mass) of polyfunctional blocked isocyanate solution formed by protecting an isocyanurate trimer of hexamethylene diisocyanate with methyl ethyl ketone oxime (solid content: 75 mass %) ("Sumidur BL3175" available from Sumika Bayer Urethane Co., Ltd.) as the thermosetting component (C); 1 part by mass of 1-[4-(2-hydroxyethoxy)phenyl]-2-hydroxy-2-methyl-1-propan-1-one ("Irgacure 2959" available from BASF Japan Co., Ltd.) and 1 part by mass of bis(2,4,6-trimethylbenzoyl)phenylphosphine oxide ("Irgacure 819" available from BASF Japan Co., Ltd.) as the photopolymerization initiator (D); and 23 parts by mass of propylene glycol monomethyl ether acetate as an organic solvent for dilution were mixed while being stirred. The mixture was filtered under increased pressure with a Polyflon filter with a pore diameter of 2 μm ("PF020" available from Advantec Toyo Co., Ltd.) and then defoamed under reduced pressure to obtain a resin varnish for forming a clad layer.

The obtained resin composition for forming a clad layer was applied on the non-treated surface of a PET film ("COSMOSHINE A4100" available from Toyobo Co., Ltd., thickness: 50 μm) with a coating machine and then dried at 100° C. for 20 minutes. Subsequently, a surface-release PET film ("Purex A31" available from Teijin DuPont Films Japan Ltd., thickness: 25 μm) as a cover film was laminated on the dried resin composition to obtain a resin film for forming a clad layer.

Preparation of Resin Film for Forming a Core Layer

The resin varnish B for forming a core layer was prepared in the same way and under the same conditions as the above-mentioned preparation example except that 26 parts by mass of phenoxy resin (product name: PHENOTOHTO YP-70, available from Tohto Kasei Co., Ltd) was used as the base polymer (A), 36 parts by mass of 9,9-bis[4-(2-acryloyloxyethoxy)phenyl]fluorene (product name: A-BPEF, available from Shin-Nakamura Chemical Co., Ltd.) and 36 parts by mass of bisphenol A epoxy acrylate (product name: EA-1020, available from Shin-Nakamura Chemical Co., Ltd.) were used as the photopolymerizable compound (B), 1 part by mass of bis(2,4,6-trimethylbenzoyl)phenylphosphine oxide (product name: Irgacure 819, available from BASF Japan) and 1 part by mass of 1-[4-(2-hydroxyethoxy)phenyl]-2-hydroxy-2-methyl-1-propane-1-one (product name: Irgacure 2959, available from BASF Japan) were used as the photopolymerization initiator (C), and 40 parts by mass of propylene glycol monomethyl ether acetate was used as an organic solvent. The resulting varnish B was filtered under increased pressure and then defoamed under reduced pressure in the same way and under the same conditions as the above-mentioned preparation example.

The resulting resin varnish B for forming a core layer was applied to an untreated surface of a PET film (product name: COSMOSHINE A1517, available from Toyobo Co., Ltd., thickness: 16 µm) and then dried in the same way as the above-mentioned preparation example. Subsequently, a surface-release PET film (product name: Purex A31, available from Teijin DuPont Films, thickness: 25 µm) as a cover film was laminated on the dried resin composition so that the releasing surface is attached to the resin side to obtain a resin film for forming a core layer.

Preparation of Optical Waveguide

The obtained resin film for forming a clad layer was released from the surface-release PET film (Purex A31) as a cover film. The released resin film for forming a clad layer was thermally compression-bonded with a FR-4 substrate (product name: MCL-E-679FGB, available from Hitachi Chemical Co. Ltd., thickness: 0.6 mm) in which 100 mm×100 mm copper foil was subjected to etching removal, in a vacuum of 500 Pa or less under conditions of a pressure of 0.4 MPa, a temperature of 50° C., and a pressure time of 30 seconds with a vacuum pressure laminator ("MVLP-500" available from Meiki Co., Ltd.) as a flat plate laminator. Through a negative photomask with two 10 mm×10 mm shading parts (space between shading parts: 300 µm), the resin film was irradiated with ultraviolet rays (wavelength: 365 nm) at a light intensity of 0.6 J/cm$^2$ with an ultraviolet exposure machine ("EXM-1172" available from Oke factory Ltd.). Subsequently, the career film was removed, and the lower clad layer 2 was etched by using a developer (1% potassium carbonate aqueous solution), washed in water, dried and cured by being heated at 170° C. for 1 hour, then at 80° C. for 10 minutes to form a lower clad layer 2 with two 10 mm×10 mm cutting parts 5.

Subsequently, the resin film for forming a core layer with a thickness of 50 µm was laminated on the lower clad layer 2 with a roll laminator ("HLM-1500" available from Hitachi Chemical Techno-Plant Co., Ltd.) under conditions of a pressure of 0.4 MPa, a temperature of 50° C., and a lamination speed of 0.2 m/min. The laminated resin film for forming a core layer was thermally compression-bonded with the lower clad layer in a vacuum of 500 Pa or less under conditions of a pressure of 0.4 MPa, a temperature of 50° C., and a pressure time of 30 seconds with a vacuum pressure laminator ("MVLP-500" available from Meiki Co., Ltd.) as a flat plate laminator with an SUS plate with a thickness of 2 mm being attached to the upper heat plate to form a core layer.

Subsequently, the negative photomask with a taper in width direction, in which the taper has a width of 50 µm at 50 mm away from the cutting part 5 and a width of 40 µm at the gap between the cutting parts, was aligned so that a core pattern is formed between the cutting parts 5. Then, the core layer was irradiated with ultraviolet rays (wavelength: 365 nm) at a light intensity of 0.6 J/cm$^2$ and followed by post-exposure heat treatment at 80° C. for 5 minutes. Subsequently, the PET film as a carrier film was removed, and then the core pattern was developed with a developer (propylene glycol monomethyl ether acetate/N,N-dimethyl acetoamide=8/2 in mass ratio). The developed core pattern was rinsed with a rinse solution (isopropanol) and then heat-dried at 100° C. for 10 minutes to form a quadrilateral trapezoid core pattern 3 with a taper in thickness direction and width direction.

Subsequently, the resin film for forming a clad layer as the upper clad layer 4 with a thickness of 54 µm was laminated in a vacuum of 500 Pa or less through heat and pressure under conditions of a pressure of 0.4 MPa, a temperature of 120° C., and a pressure time of 30 seconds with a vacuum pressure laminator ("MVLP-500" available from Meiki Co., Ltd.) with an SUS plate with a thickness of 2 mm being attached to the upper heat plate. The laminated resin film for forming a clad layer was irradiated with ultraviolet rays (wavelength: 365 nm) at light intensity of 4 J/cm$^2$, and then the carrier film was removed. The irradiated resin film for forming a clad layer was heated at 170° C. for 1 hour to prepare the optical waveguide shown in FIG. 1.

The heights of the thin part of the core with a taper in the obtained optical waveguide were 39.5 µm (at the thin film end of the optical waveguide), 42.5 µm (3 mm away from the thin film end), and 46.7 µm (6 mm away from the thin film end). On the other hand, the heights of the thick part were 49.9 µm (at the thick film end of the optical waveguide), 49.9 µm (3 mm away from the thick film end), and 48.5 µm (6 mm away from the thick film end).

The total thicknesses of the core and the upper clad layer were 54.5 µm (at the thin film end of the optical waveguide), 57.5 µm (3 mm away from the thin film end), and 60.3 µm (6 mm away from the thin film end). On the other hand, the heights of the thick part were 65.2 µm (at the thick film end of the optical waveguide), 65.2 µm (3 mm away from the thick film end), and 65.2 µm (6 mm away from the thick film end).

Example 2

Figure 10:
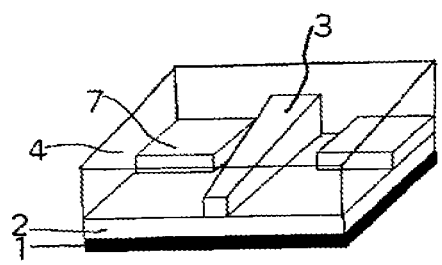
FIG. 10 shows the perspective view illustrating one of other examples of the optical waveguide of the present invention.

Preparation of Optical Waveguide of FIG. 10

Unlike Example 1, no cutting parts 5 were formed on the lower clad layer 2. The obtained resin film for forming a clad layer with a thickness of 10 µm was released from the surface-release PET film (Purex A31) as a cover film. The released resin film for forming a clad layer was thermally compression-bonded with the lower clad layer 2 in a vacuum of 500 Pa or less under conditions of a pressure of 0.4 MPa, a temperature of 50° C., and a pressure time of 30 seconds with a vacuum pressure laminator ("MVLP-500" available from Meiki Co., Ltd.) as a flat plate laminator. Through a negative photomask with two 10 mm×10 mm open parts (space between open parts; 300 µm), the resin film was irradiated with ultraviolet rays (wavelength: 365 nm) at a light intensity of 0.6 J/cm with an ultraviolet exposure machine ("EXM-1172" available from Oke factory Ltd. Subsequently, the career film was removed, and the lower clad layer 2 was etched by using a developer (1% potassium carbonate aqueous solution), washed in water, dried and cured by being heated at 170° C. for 1 hour, then at 80° C. for 10 minutes to form a lower clad layer 2 with two 10 mm×10 mm dummy layers 7. Subsequently, the resin film for forming a core layer with a thickness of 40 μm was laminated on the lower clad layer 2 with a roll laminator ("HLM-1500" available from Hitachi Chemical Techno-Plant Co., Ltd.) under conditions of a pressure of 0.4 MPa, a temperature of 50° C., and a lamination speed of 0.2 m/min . The laminated resin film for forming a core layer was thermally compression-bonded with the lower clad layer in a vacuum of 500 Pa or less under conditions of a pressure of 0.4 MPa, a temperature of 50° C., and a pressure time of 30 seconds with a vacuum pressure laminator ("MVLP-500" available from Meiki Co., Ltd.) as a flat plate laminator with an SUS plate with a thickness of 2 mm being attached to the upper heat plate to form a core layer.

Subsequently, the negative photomask with a taper in width direction, which has a width of 40 μm at 50 mm away from the dummy layer 7 and a width of 50 μm at the gap between the dummy layers, was aligned so that a core pattern is formed between the dummy layers 7. Then, the core layer was irradiated with ultraviolet rays (wavelength: 365 nm) at a light intensity of 0.6 J/cm followed by post-exposure heat treatment at 80° C. for 5 minutes. Subsequently, the PET film as a carrier film was removed, and then the core pattern was developed with a developer (propylene glycol monomethyl ether acetate/N,N-dimethyl acetoamide=8/2 in mass ratio). The developed core pattern was rinsed with a rinse solution (isopropanol) and then heat-dried at 100° C. for 10 minutes to form a core pattern 3 with a taper in thickness direction and width direction.

The upper clad layer was formed in the same way as Example 1 to prepare the optical waveguide shown in FIG. 10.

The heights of the thin part of the core with a taper in the obtained optical waveguide were 40.1 μm (at the thin film end of the optical waveguide), 40.1 μm (3 mm away from the thin film end), and 42.4 μm (6 mm away from the thin film end). On the other hand, the heights of the thick part were 49.9 μm (at the thick film end of the optical waveguide), 46.3 μm (3 mm away from the thick film end), and 45.0 μm (6 mm away from the thick film end).

The total thickness of the core and the upper clad layer were 55.5 μm (at the thin film end of the optical waveguide), 55.5 μm (3 mm away from the thin film end), and 58.3 μm (6 mm away from the thin film end). On the other hand, the heights of the thick part is 64.5 μm (at the thick film end of the optical waveguide), 62.1 μm (3 mm away from the thick film end), and 60.2 μm (6 mm away from the thick film end).

Example 3

Preparation of Optical Waveguide of FIG. 14

Unlike Example 1, a 10 mm×10 mm cutting part 5 was formed on the lower clad layer 2, and a 10 mm×10 mm dummy layer 7 was formed 20 mm away from the cutting part 5. The core layer was formed in the same way as Example 1.

Subsequently, the negative photomask with a taper in width direction, which has a width of 40 μm near the cutting part 5 and a width of 50 μm near the dummy layer 7, was aligned so that the cutting part 5 was connected with the dummy layers 7. Then, the core layer was irradiated with ultraviolet rays (wavelength: 365 nm) at a light intensity of 0.6 J/cm followed by post-exposure heat treatment at 80° C. for 5 minutes, Subsequently, the PET film as a carrier film was removed, and then the core pattern was developed with a developer (propylene glycol monomethyl ether acetate/N,N-dimethyl acetoamide=8/2 in mass ratio). The developed core pattern was rinsed with a rinse solution (isopropanol) and then heat-dried at 100° C. for 10 minutes to form a quadrilateral trapezoid core pattern 3 with a taper in thickness direction and width direction.

The upper clad layer 4 was formed in the same manner as Example 1 to prepare the optical waveguide shown in FIG. 14.

The heights of the thin part of the core with a taper in the obtained optical waveguide were 41.1 μm (at the thin film end of the optical waveguide), 43.2 μm (3 mm away from the thin film end), and 44.4 μm (6 mm away from the thin film end). On the other hand, the heights of the thick part were 49.9 μm (at the thick film end of the optical waveguide), 47.2 μm (3 mm away from the thick film end), and 46.2 μm (6 mm away from the thick film end).

The total thickness of the core and the upper clad layer were 54.5 μm (at the thin film end of the optical waveguide), 55.5 μm (3 mm away from the thin film end), and 57.1 μm (6 mm away from the thin film end). On the other hand, the heights of the thick part is 64.5 μm (at the thick film end of the optical waveguide), 62.0 μm (3 mm away from the thick film end), and 61.0 μm (6 mm away from the thick film end).

Example 4

Preparation of Optical Waveguide of FIG. 4

Except that 50 μm core patterns (dummy cores 6) with a pitch width of 250 μm were formed on the cutting parts 5, the optical waveguide shown in FIG. 4 was prepared in the same way as Example 1.

The heights of the thin part of the core with a taper in the obtained optical waveguide were 39.4 μm (at the thin film end of the optical waveguide), 42.4 μm (3 mm away from the thin film end), and 46.5 μm (6 mm away from the thin film end). On the other hand, the heights of the thick part were 50.0 μm (at the thick film end of the optical waveguide), 49.9 μm (3 mm away from the thick film end), and 48.4 μm (6 mm away from the thick film end).

The total thickness of the core and the upper clad layer were 65.3 μm (at the thin film end of the optical waveguide), 64.3 μm (3 mm away from the thin film end), and 65.0 μm (6 mm away from the thin film end). On the other hand, the heights of the thick part is 65.2 μm (at the thick film end of the optical waveguide), 65.2 μm (3 mm away from the thick film end), and 64.5 μm (6 mm away from the thick film end).

Example 5

Preparation of Optical Waveguide of FIG. 7

Except that core patterns (dummy cores 6) were formed on the entire surface of the cutting parts 5, the optical waveguide shown in FIG. 7 was prepared in the same way as Example 1.

The heights of the thin part of the core with a taper in the obtained optical waveguide were 39.5 μm (at the thin film end of the optical waveguide), 42.4 μm (3 mm away from the thin film end), and 46.6 μm (6 mm away from the thin film end). On the other hand, the heights of the thick part were 50.0 μm (at the thick film end of the optical waveguide), 50.0 μm (3 mm away from the thick film end), and 48.2 μm (6 mm away from the thick film end).

The total thickness of the core and the upper clad layer were 75.3 μm (at the thin film end of the optical waveguide), 73.3 μm (3 mm away from the thin film end), and 68.0 μm (6 mm away from the thin film end). On the other hand, the heights of the thick part is 65.2 μm (at the thick film end of the optical waveguide), 65.2 µm (3 mm away from the thick film end), and 64.5 µm (6 mm away from the thick film end).

Example 6

Preparation of Optical Waveguide of FIG. 2

Except that the cutting parts 5 have a shape of isosceles right triangle, one side of which was 10 mm, the optical waveguide shown in FIG. 2 was prepared in the same way as Example 1.

The heights of the thin part of the core with a taper in the obtained optical waveguide were 40.0 µm (at the thin film end of the optical waveguide), 41.7 µm (3 mm away from the thin film end), and 43.1 µm (6 mm away from the thin film end). On the other hand, the heights of the thick part were 50.0 µm (at the thick film end of the optical waveguide), 49.9 µm (3 mm away from the thick film end), and 48.8 µm (6 mm away from the thick film end).

The total thickness of the core and the upper clad layer were 55.1 µm (at the thin film end of the optical waveguide), 56.1 µm (3 mm away from the thin film end), and 57.3 µm (6 mm away from the thin film end). On the other hand, the heights of the thick part is 65.2 µm (at the thick film end of the optical waveguide), 65.2 µm (3 mm away from the thick film end), and 62.5 µm (6 mm away from the thick film end).

INDUSTRIAL APPLICABILITY

As described in detail above, the optical waveguide of the present invention, particularly an optical wave guide with a core pattern having a taper in thickness direction can secure alignment tolerance when connected with an optical element because the thickness of the optical waveguide is adjusted so as to or not so as to taper this thickness.

Therefore, the optical waveguide is useful as a device for a connector between an optical fiber and an optical waveguide and a device in which an optical waveguide is combined with an electrical wiring board.

DESCRIPTION OF THE SYMBOLS 1 substrate
2 lower clad layer
3 core pattern
4 upper clad layer
5 cutting part
6 dummy core
7 dummy layer (clad layer)
8 lower clad layer
9 dummy layer (clad layer)
A taper
B, C flat part

The invention claimed is:

1. An optical waveguide comprising: a substrate; a lower clad layer; a core pattern with a taper in thickness direction; and an upper clad layer, the lower clad layer, the core pattern, and the upper clad layer being sequentially laminated on the substrate,
wherein the optical waveguide further includes a cutting part formed by removing a part of the lower clad layer from one principal plane thereof, said one principal plane being the plane thereof closest to the core pattern, to the other principal plane of the lower clad layer, opposite to said one principal plane, and
wherein the upper clad layer extends so as to overlie the lower clad layer, the core pattern and the cutting part.

2. The optical waveguide according to claim 1, wherein the cutting part has an area at the thin side of the taper of the core pattern that is larger than that at the thick side of the taper.

3. The optical waveguide according to claim 1, wherein the cutting part is located in a part where no core patterns exist ahead of the tip end of the thin side of the taper of the core pattern.

4. The optical waveguide according to claim 1, wherein the upper clad layer has a taper in thickness direction, and the taper becomes thinner toward in the same direction as the thinner direction of the taper of the core pattern.

5. The optical waveguide according to claim 1, comprising a dummy core in the cutting part.

6. The optical waveguide according to claim 4, wherein the upper clad layer has a taper in thickness direction, and the taper becomes thinner toward in the opposite direction to the thinner direction of the taper of the core pattern.

7. An optical waveguide comprising a substrate, a lower clad layer; a dummy layer, the dummy layer being a layer in addition to the lower clad layer; a core pattern with a taper in thickness direction; and an upper clad layer, the lower clad layer, the dummy layer, the core pattern, and the upper clad layer being sequentially laminated on the substrate, wherein the dummy layer is located on the lower clad layer.

8. The optical waveguide according to claim 7, wherein the dummy layer has an area at the thick side of the taper of the core pattern which is larger than that at the thin side of the taper.

9. The optical waveguide according to claim 7, wherein the dummy layer is positioned in a part where no core patterns exist behind the bottom end of the thin side of the taper of the core pattern.

10. The optical waveguide according to claim 7, wherein the dummy layer is a clad layer.

11. The optical waveguide according to claim 1, wherein the core pattern with a taper in thickness direction has a taper in width direction.

12. The optical waveguide according to claim 7, wherein the core pattern with a taper in thickness direction has a taper in width direction.

13. The optical waveguide according to claim 1, wherein the substrate is uncovered by the lower clad layer at the cutting part.

14. The optical waveguide according to claim 1, wherein the upper clad layer extends in contact with the substrate at the cutting part.

15. The optical waveguide according to claim 1, wherein the upper clad layer has no cutting part formed by removing a part of the upper clad layer from one principal plane thereof, said one principal plane thereof being an upper surface of the upper clad layer, to the other principal plane of the upper clad layer opposite to said one principal plane of the upper clad layer.

* * * * *